United States Patent
Irisawa

(10) Patent No.: US 7,340,276 B2
(45) Date of Patent: Mar. 4, 2008

(54) SYSTEM FOR DOWNLOADING PROGRAM TO GENERAL-PURPOSE SUBSCRIBER IDENTIFICATION MODULE

(75) Inventor: Kazuyoshi Irisawa, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 475 days.

(21) Appl. No.: 10/257,190

(22) PCT Filed: Feb. 27, 2002

(86) PCT No.: PCT/JP02/01791

§ 371 (c)(1),
(2), (4) Date: Oct. 8, 2002

(87) PCT Pub. No.: WO02/069653

PCT Pub. Date: Sep. 6, 2002

(65) Prior Publication Data

US 2003/0092434 A1    May 15, 2003

(30) Foreign Application Priority Data

Feb. 28, 2001 (JP) .............................. 2001-054265

(51) Int. Cl.
*H04B 1/38* (2006.01)
(52) U.S. Cl. ...................... 455/558; 455/418; 455/419; 455/420; 463/42; 380/270; 713/164; 713/189; 713/194; 717/169; 717/170
(58) Field of Classification Search ................ 455/558, 455/557, 418–420, 550.1, 410–411; 713/164, 713/189, 194, 182–184; 235/380, 486, 382.5; 380/266, 270, 247; 702/186; 340/568.7; 709/204; 463/42; 717/168–173
See application file for complete search history.

(56) References Cited

U.S. PATENT DOCUMENTS

| | | | | |
|---|---|---|---|---|
| 4,860,341 A | * | 8/1989 | D'Avello et al. | 455/409 |
| 5,418,837 A | * | 5/1995 | Johansson et al. | 455/558 |
| 5,930,704 A | * | 7/1999 | Kay | 455/419 |
| 5,999,808 A | * | 12/1999 | LaDue | 455/412.2 |
| 6,011,976 A | * | 1/2000 | Michaels et al. | 455/466 |

(Continued)

FOREIGN PATENT DOCUMENTS

EP    1043906    10/2000

(Continued)

*Primary Examiner*—Sharad Rampuria
(74) *Attorney, Agent, or Firm*—James H. Walters

(57) ABSTRACT

The invention provides a program-downloading system comprising a USIM (1) from and in which data can be read and written via a cellular phone terminal (2) and which holds a given program specification and encryption communication means, and a program server for communicating with the USIM via the cellular phone terminal and providing a program to the universal subscriber identify module according to the given program specification. The program server prepares a program list that can be provided according to a program specification sent out of the USIM via the cellular phone terminal and transmits the program list to the cellular phone terminal, so that when program information selected by the USIM from the program list is received via the cellular phone terminal, a given encryption communication means is selected out of an encryption communication means list transmitted out of the USIM to encrypt a program, which is then downloaded to the USIM.

3 Claims, 2 Drawing Sheets

U.S. PATENT DOCUMENTS

| | | | |
|---|---|---|---|
| 6,047,071 A | 4/2000 | Shah | |
| 6,097,967 A | 8/2000 | Hubbe et al. | |
| 6,424,845 B1 * | 7/2002 | Emmoft et al. | 455/575.1 |
| 6,484,024 B1 * | 11/2002 | Darnault et al. | 455/418 |
| 6,615,057 B1 * | 9/2003 | Pettersson | 455/558 |
| 6,650,892 B1 * | 11/2003 | Thiriet | 455/419 |
| 6,671,522 B1 * | 12/2003 | Beaudou | 455/558 |
| 6,859,650 B1 * | 2/2005 | Ritter | 455/406 |
| 6,976,171 B1 * | 12/2005 | Ritter et al. | 713/193 |

FOREIGN PATENT DOCUMENTS

| | | |
|---|---|---|
| JP | 10-301760 | 11/1998 |
| JP | 2001-16634 | 1/2001 |
| JP | 2001-53743 | 2/2001 |
| WO | 00/65855 | 11/2000 |
| WO | WO 200069191 A1 * | 11/2000 |

* cited by examiner

FIG. 3

| Identification information | Program language |
|---|---|
| 01h | Java |
| 02h | MEL |
| 03h | C language |
| 04h | Machine language |
| ---------------- | ---------------- |

FIG. 4

| Identification Info. | Name of Service | Price | -------- |
|---|---|---|---|
| 01h | Game | aa | |
| 02h | Electric Purse | bb | |
| 03h | Ticket | cc | |
| -------- | ---------- | ----- | |

SYSTEM FOR DOWNLOADING PROGRAM TO GENERAL-PURPOSE SUBSCRIBER IDENTIFICATION MODULE

ART FIELD

The present invention relates to a system for downloading a program from a program server to a universal subscriber identity module via a cellar phone system.

BACKGROUND ART

Cellular phones available mainly across Europe have already been designed by encasing in cellular phone cases a plug-in form of subscriber identity modules (abbreviated as SIMs) with IC chips having programs to make cellular phone's function implementable. In more recent years, however, universal subscriber identity modules (hereinafter referred to as USIMs for short) designed to enable the SIMs to be utilized all over the world have been under consideration.

Conventional cellular phone systems, by the way, are merely allowed to register therein an application program in a single language; when USIMs having interpreters in varying languages are co-resident and available for each user, it is impossible to download programs to all users via cellular phone systems. Never until now is there any solution to this problem.

Having been made to solve the aforesaid problem, the present invention has for its object to enable programs to be downloaded through cellular phone systems with high security, even when USIMs having interpreters of varying program specifications are co-resident and available for each user.

DISCLOSURE OF THE INVENTION

The present invention provides a program-downloading system for a universal subscriber identify module, characterized by comprising a universal subscriber identify module from and in which data are read and written via a cellular phone terminal and which holds a given program specification and encryption communication means, and a program server for communicating with said universal subscriber identify module via said cellular phone terminal and providing a program to said universal subscriber identify module according to said given program specification, wherein:

said program server prepares a program list that can be provided according to a program specification sent out of the universal subscriber identify module via the cellular phone terminal and transmits said program list to the cellular phone terminal, so that when program information selected by the universal subscriber identify module from said program list is received via the cellular phone terminal, a given encryption communication means is selected out of an encryption communication means list transmitted out of the universal subscriber identify module to encrypt a program, which is then downloaded to the universal subscriber identify module by virtue of encryption communication via the cellular phone terminal.

In a specific embodiment of the invention, the present system is characterized in that the program list transmitted to said universal subscriber identify module is displayed on a display of the cellular phone terminal for selection.

In another specific embodiment of the invention, the present system is characterized in that the encrypted program received at the cellular phone system is written in the universal subscriber identify module by means of encryption communication.

BRIEF DESCRIPTION OF THE DRAWINGS

FIG. 3 is illustrative of typical program languages for IC cards.

FIG. 4 is a screen for making a selection from the programs to be downloaded.

BEST MODE OF CARRYING OUT THE INVENTION

Figure 1:
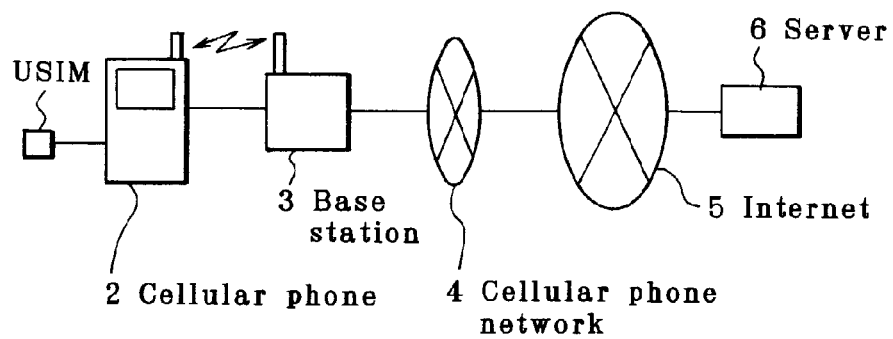
FIG. 1 is a conceptual schematic illustrative of the system of the invention.
Figure 2:
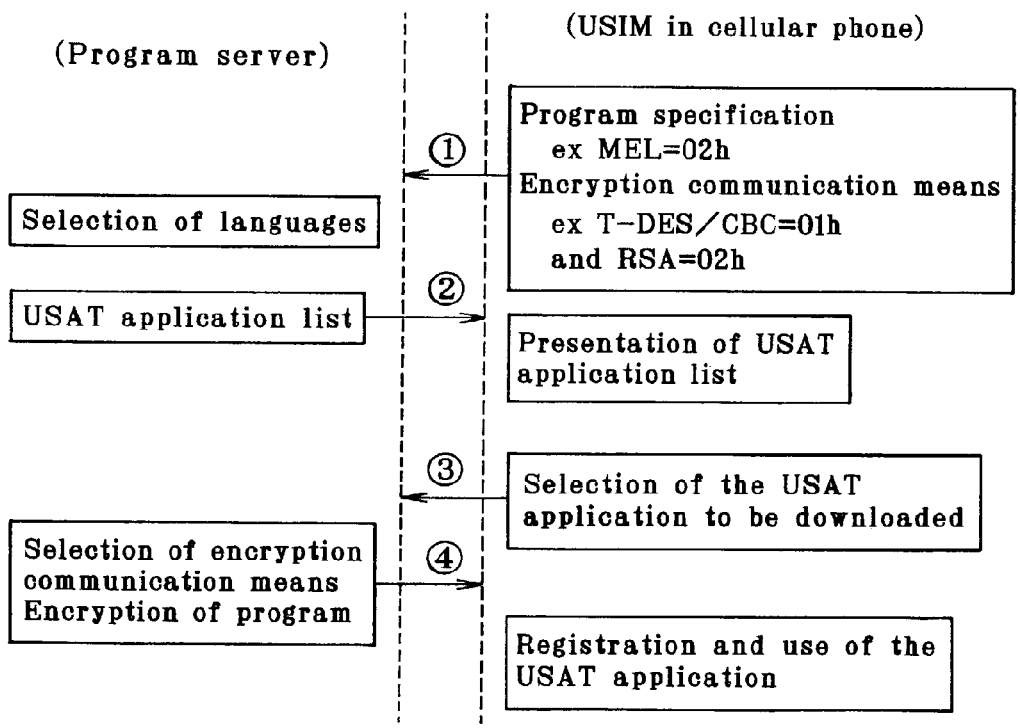
FIG. 2 is a flowchart illustrative of the process for downloading a program.

Some embodiments of the invention are now explained. FIG. 1 is a conceptual schematic illustrative of the system of the invention; FIG. 2 is a flowchart illustrative of the process for downloading a program; FIG. 3 is illustrative of typical program languages for IC cards; and FIG. 4 is a screen for making a selection from the programs to be downloaded.

Including memory means and arithmetic and logic means (CPU), a USIM1 is a module having the function of installing an execution program that is translated in machine or other languages. The module is an IC card cut out in a plug-in form, and so is much the same as an IC card in terms of physical interface structures (contact terminal surfaces) at electrical junctions, electrical communications, etc. With USIM1—having identity information stored therein—incorporated in a cellular phone having a transmit/receive function, cellular phone capabilities are achievable. This USIM1 is connected to a current cellular phone 2, which is then connected to the Internet through a cellular phone base station 3 and a cellular phone network 4, so that it can be in communication with a program server 6 for providing a variety of programs. It is noted that the cellular phone 2 plays a reader/writer role for USIM1.

Upon powered on by the cellular phone 2, USIM1 produces a reset response (in the form of information to interface specifications such as protocols) and is in a command wait mode, so that on commands received from the cellular phone, various operations such as read/write processing can take place. The data subjected to read/write processing comprise a plurality of files having a hierarchical structure general for computers, so that a unique selection can be made by a file selection command, giving access to data-in the files, for instance, records. If an encryption key compatible with encryption communication capabilities is pre-registered in USIM1 for the purpose of writing programs, etc., it is then also possible to make use of encryption communications between the cellular phone and USIM1.

A process for downloading programs to receive an additional service in addition to those pre-stored in a USIM is now explained with reference to FIGS. 2 to 4.

A USIM1 holds an interpreter to a specific program specification. As shown in FIG. 3, the USIM1 stores as typical IC card program languages such data as Java=01h, MEL=02h, C language=03h, machine language=04h (serial Nos. 01h, 02h, 03h and 04h are identification numbers) . . . . In this embodiment, program language MEL=02h data and such data as T-DES/CBC mode=01h having three mutual privacy keys and public key RSA=02h mode (serial Nos. 01h and 02h are identification numbers) providing encryption communication means are pre-stored in USIM1. The thus stored data are acquired as a response to a read command that is sent from the cellular phone to the USIM.

The cellular phone 2 takes from within USIM1 program specification identification information and a list for encryption communication means to send them to a program server (step 1). Upon receipt of them, the program server generates from the program specification identification information a list of service names corresponding to program identification information fit for a program specification that the program server has by itself (such as a textual character string for a brief explanation of services). The thus generated list is sent from the program server to the cellular phone (step 2), so that, as shown in FIG. 4, it appears as a service list with price on the display of the cellular phone, urging the user to push a button or the like on the cellular phone to make a selection from the list.

As the user selects one or more services from the presented list, program identification information (e.g., 03h) is sent from the cellular phone to the program server (step 3), where the desired program corresponding to the USIM is specified, followed by selection of the type of encryption communication means. More specifically, one type of encryption communication means that the program server can provide (e.g., 02h:RSA) is selected from an information list for identifying the type of encryption communication means sent back from the USIM, so that the type of encryption communication means for the downloading of programs is specified. Then, identification information for the thus specified type of encryption communication means is transmitted to the USIM via the cellular phone so that encryption communication can be established between the USIM and the program server, thereby downloading the program with safety via encryption communication from the program server (step 4). At the USIM in which the downloaded program is installed, it is possible to make use of an additional service downloaded from the next session.

POSSIBLE APPLICATIONS IN INDUSTRY

According to the invention as explained above, even when USIMs having interpreters to varying program specifications are co-resident and held for each user, it is possible to reduce loads because it is only needed to have minimum information (program specification) on the respective terminal sides in the system. Well-aligned encryption communications between the microcomputers of IC cards and the program server ensures security of data in areas where identity information, etc. are stored. It follows that users can enjoy, in addition to services pre-stored in USIMs, a plurality of additional services without taking heed of the type of USIMs and with great safety.

I claim:

1. A program-downloading system for a universal subscriber identity module, characterized by comprising a universal subscriber identity module from and in which data are read and written via signals sent to and from a cellular phone terminal and which holds a given program specification and encryption communication means, and a program server for communicating with said universal subscriber identity module via a signal received by said cellular phone terminal and providing a program to said universal subscriber identity module according to said given program specification, wherein:

said program server prepares a program list that can be provided according to a program specification identification information sent out of the universal subscriber identity module via a signal sent by the cellular phone terminal, said program specification including specification of program languages and version information, and transmits said program list to the cellular phone terminal via a signal, said program list being selected to be in accordance with details provided by said program specification, so that when program information selected by the universal subscriber identity module from said program list is received via a signal sent from the cellular phone terminal, a given encryption communication means is selected by the program server out of an encryption communication means list transmitted out of the universal subscriber identity module via a signal also sent from the cellular phone terminal to encrypt a program, which is then downloaded to the universal subscriber identity module by virtue of encryption communication originating from the program server and sent via a signal to the cellular phone terminal.

2. The program-downloading system according to claim 1, characterized in that the program list transmitted to said universal subscriber identity module is indicated on a display of the cellular phone terminal for selection.

3. The program-downloading system according to claim 1, characterized in that the encrypted program received at the cellular phone system is written in the universal subscriber identity module by means of encryption communication.

* * * * *